（12） United States Patent
Son et al.

(10) Patent No.: US 10,207,483 B2
(45) Date of Patent: Feb. 19, 2019

(54) LAMINATION DEVICE

(71) Applicant: SAMSUNG DISPLAY CO., LTD., Yongin-si, Gyeonggi-do (KR)

(72) Inventors: Yanghan Son, Cheonan-si (KR); Byungik Kong, Gimhae-si (KR); Sehun Park, Asan-si (KR); Gwang-jea Seo, Cheonan-si (KR); Youngkuil Joo, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 368 days.

(21) Appl. No.: 15/231,610

(22) Filed: Aug. 8, 2016

(65) Prior Publication Data
US 2017/0050424 A1 Feb. 23, 2017

(30) Foreign Application Priority Data

Aug. 19, 2015 (KR) .................. 10-2015-0116830

(51) Int. Cl.
B32B 37/00 (2006.01)
B32B 37/10 (2006.01)
B32B 38/18 (2006.01)

(52) U.S. Cl.
CPC .......... B32B 37/10 (2013.01); B32B 37/0046 (2013.01); B32B 38/1866 (2013.01); B32B 2250/02 (2013.01); B32B 2307/202 (2013.01); B32B 2307/412 (2013.01); B32B 2457/20 (2013.01)

(58) Field of Classification Search
CPC .. B32B 37/10; B32B 37/0046; B32B 38/1866
USPC ...................................... 156/580, 581, 583.1
See application file for complete search history.

(56) References Cited

U.S. PATENT DOCUMENTS 9,981,417 B2 * 5/2018 Park ....................... B29C 51/08
2014/0299269 A1 10/2014 Son et al.

FOREIGN PATENT DOCUMENTS

CN 104097383 A 10/2014
KR 10-2014-0120568 A 10/2014

* cited by examiner

Primary Examiner — James D Sells
(74) Attorney, Agent, or Firm — Lewis Roca Rothgerber Christie LLP

(57) ABSTRACT

A lamination device according to embodiments of the present disclosure includes a support table, a first plate coupled to the support table, a second plate coupled to the first plate and configured to be attachable to and detachable from the first plate, a jig spaced from the second plate and configured to hold a window, the jig including a flat surface portion, and side surface portions extending from opposite sides of the flat surface portion, and a pad on the second plate and configured to pressurize an electric panel on the window.

20 Claims, 12 Drawing Sheets

LAMINATION DEVICE

CROSS-REFERENCE TO RELATED APPLICATIONS

This U.S. non-provisional patent application claims priority to, and the benefit of, Korean Patent Application No. 10-2015-0116830, filed on Aug. 19, 2015, in the Korean Intellectual Property Office, the contents of which are hereby incorporated by reference in their entirety.

BACKGROUND

1. Field

The present disclosure relates to a lamination device.

2. Description of the Related Art

In recent years, demand for display devices in a variety of designs has increased, and thus, display devices based on these designs have been actively developed. In addition, a lamination device that attaches an electric panel to a window has been developed.

As an example, a technology of attaching the electric panel to the window using a pad has been widely used. The pad is fixed to a fixing plate and disposed under the electric panel to pressurize the electric panel to the window. As a result, the electric panel is attached to the window.

However, when the electric panel is pressurized on the window, the pad is damaged due to friction between the electric panel and the pad. In this case, when the pad is replaced, the fixing plate that is fixed to the pad needs to be replaced. Accordingly, manufacturing cost of the display device increases.

SUMMARY

Embodiments of the present disclosure provide a lamination device including a first plate and a second plate attached with a pad and attachable to and detachable from the first plate.

Embodiments of the inventive concept provide a lamination device including a support table, a first plate coupled to the support table, a second plate coupled to the first plate and configured to be attachable to and detachable from the first plate, a jig spaced from the second plate and configured to hold a window, the jig including a flat surface portion, and side surface portions extending from opposite sides of the flat surface portion, and a pad on the second plate and configured to pressurize an electric panel on the window.

The lamination device may further include dams respectively supporting opposing side surfaces of the pad.

Each of the dams may include a pad contact dam portion on the second plate, and may include a fixing dam portion on the first plate and extending from the pad contact dam portion.

The second plate may include a pad portion to which the pad is attached, and may include coupling portions adjacent to the pad portion, respective ones of the coupling portions corresponding to respective ones of the pad contact dam portions.

The lamination device may further include a coupling member. The first plate may define first coupling openings, the second plate may define second coupling openings aligned with the first coupling openings, each of the pad contact dam portions may define coupling recesses aligned with the second coupling openings, and the coupling member may be coupled to the first plate at the first coupling openings, the second plate at the second coupling openings, and the pad contact dam portions at the respective coupling recesses.

The first plate may include a flat surface portion supporting the second plate, the dams may protrude from the flat surface portion of the first plate to respectively support the opposing side surfaces of the pad, and the dams may be integrally formed with the flat surface portion.

The lamination device may further include a coupling member. The first plate may define coupling openings, the second plate may define coupling recesses aligned with the coupling openings, and the coupling member may be coupled to the first plate at the coupling openings and the second plate at the coupling recesses.

The pad may have an area that is equal to an area of the first plate.

Each of the side surface portions of the jig may include a curved surface portion.

The pad may be elastic.

The second plate may have a thickness that is less than a thickness of the first plate.

The window may include a window flat surface portion configured to be attached to the flat surface portion of the jig, and window side surface portions bent from the window flat surface portion, and configured to be attached to the side surface portions of the jig.

The electric panel may include an electric panel flat surface portion configured to be attached to the window flat surface portion, and electric panel curved surface portions bent from opposite sides of the electric panel flat surface portion, and configured to be attached to the window side surface portions.

The lamination device may further include an adhesive layer between the pad and the first plate.

Embodiments of the inventive concept provide a lamination device including a support table, a first plate including a plurality of coupling protrusions, and coupled to the support table, a second plate including a plurality of coupling recesses configured to be coupled to the coupling protrusions, a jig spaced from the second plate and configured to hold a window, the jig including a flat surface portion, and side surface portions extending from opposite sides of the flat surface portion, a pad on the second plate and configured to pressurize an electric panel on the window, a first dam supporting a first side surface of the pad, and a second dam facing the first dam and supporting a second side surface of the pad. The coupling protrusions are coupled to the coupling recesses when the first plate is inserted between the first and second dams.

The second plate may have a thickness that is less than a thickness of the first plate.

The lamination device may further include a first coupling member and a second coupling member. The first dam may define a first coupling recess, the second dam may define a second coupling recess, the first plate may define a first coupling opening aligned with the first coupling recess and a second coupling opening aligned with the second coupling recess, the first coupling member may be coupled to the first dam at the first coupling recess and the first plate at the first coupling opening, and the second coupling member may be coupled to the second dam at the second coupling recess and the second plate at the second coupling opening.

The first plate may include a flat surface portion supporting the second plate, and the first and second dams may protrude from the flat surface portion to respectively support the first side surface and the second side surface of the pad, and the first and second dams may be integrally formed with the flat surface portion.

The pad may be elastic.

The pad may have an area that is equal to an area of the first plate.

According to the above, the second plate to which the pad is attached may be replaced with another second plate when the pad is replaced. As such, the second plate is replaced instead of both the first and second plates, and thus, a cost associated with the replacement of the plates may be reduced.

BRIEF DESCRIPTION OF THE DRAWINGS

The above and other aspects of the present disclosure will become readily apparent by reference to the following detailed description when considered in conjunction with the accompanying drawings, wherein.

DETAILED DESCRIPTION

Figure 1:
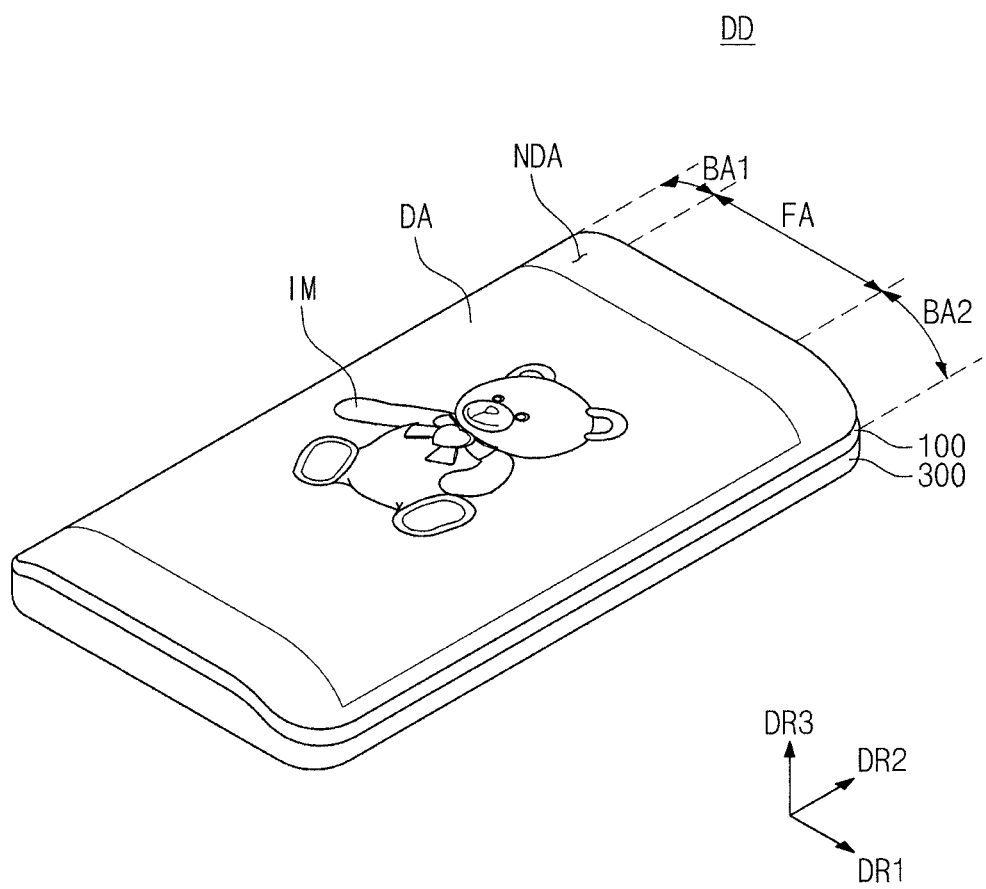
FIG. 1 is a perspective view of a display device according to one or more exemplary embodiments of the present disclosure.

Hereinafter, example embodiments will be described in more detail with reference to the accompanying drawings. The present invention, however, may be embodied in various different forms, and should not be construed as being limited to the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description and, thus, descriptions thereof may not be repeated. In the drawings, the relative sizes of elements, layers, and regions may be exaggerated for clarity.

It will be understood that when an element or layer is referred to as being "on," "connected to" or "coupled to" another element or layer, it can be directly on, connected to or coupled to the other element or layer or intervening elements or layers may be present. When an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a" and "an" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using" and "used" may be considered synonymous with the terms "utilize," "utilizing" and "utilized," respectively. Also, the term "exemplary" is intended to refer to an example or illustration.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention are described with reference to the accompanying drawings.

Figure 2:
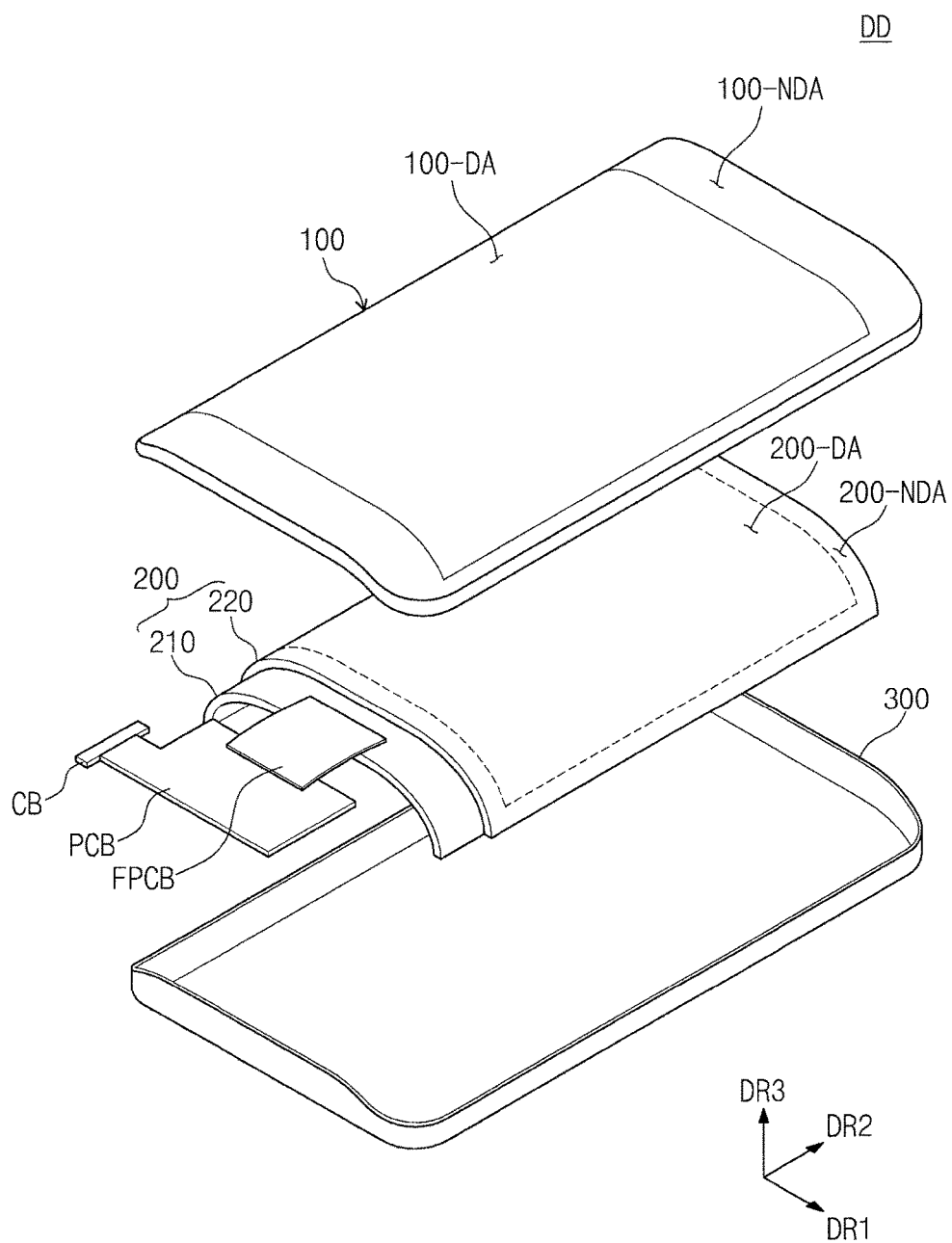
FIG. 2 is an exploded perspective view of the display device of FIG. 1.

FIG. 1 is a perspective view of a display device DD according to one or more exemplary embodiments of the present disclosure, and FIG. 2 is an exploded perspective view of the display device DD of FIG. 1.

FIG. 1 shows a portable terminal to which the display device DD is applied as a representative example. The portable terminal may include a tablet personal computer, a smart phone, a personal digital assistant (PDA), a portable multimedia player (PMP), a game unit and/or a wrist-type electronic device, but the present invention is not limited thereto or thereby. For example, the display device may be applied to a large-sized electronic item, such as a television set, an outdoor billboard, etc., and a small and medium-sized electronic item, such as a personal computer, a notebook computer, a navigation unit, a camera, etc., but the present invention is not limited thereto or thereby.

Referring to FIG. 1, the display device DD includes a plurality of areas distinct from each other on a display surface thereof. The display device DD includes a display area DA for displaying an image and a non-display area NDA disposed adjacent to the display area DA. The display area DA has a substantially quadrangular shape, and the non-display area NDA surrounds the display area DA.

The display device DD may have a partially curved shape. The display device DD may include a flat portion FA and curved portions BA1 and BA2 at opposite sides of the flat portion FA.

The flat portion FA is substantially parallel to a surface defined by a first direction DR1 and a second direction DR2 and a direction normal to the flat portion FA is a third direction DR3. The third direction DR3 corresponds to a reference direction to separate a front surface and a rear surface of the display device DD, but the first, second, and third directions DR1, DR2, and DR3 may be changed to another direction because the first, second, and third directions DR1, DR2, and DR3 are a relative concept.

The curved portions BA1 and BA2 include a first curved portion BA1 and a second curved portion BA2. The first and second curved portions BA1 and BA2 are arranged along the first direction DR1 to face each other such that the flat portion FA is disposed between the first and second curved portions BA1 and BA2. The first and second curved portions BA1 and BA2 are substantially parallel to each other. In FIG. 1, the first and second curved portions BA1 and BA2 extend in the second direction DR2. In the some exemplary embodiments, the display device DD may include two curved portions, e.g., the first and second curved portions BA1 and BA2, but in other embodiments, the display device DD may include only one of the first and second curved portions BA1 and BA2.

Referring to FIGS. 1 and 2, the display device DD includes a window 100, an electric panel 200, and a rear case 300.

Each of the window 100 and the electric panel 200 may have a partially curved shape. For example, each of the window 100 and the electric panel 200 may include a flat portion and a curved portion. The flat portions of the window 100 and the electric panel 200 correspond to the flat portion FA of the display device DD, and the curved portions of the window 100 and the electric panel 200 correspond to the curved portions BA1 and BA2 of the display device DD.

The window 100 includes a display area 100-DA that transmits (e.g., is configured to transmit) an image IM provided by (or from) the electric panel 200, and a non-display area 100-NDA disposed adjacent to the display area 100-DA.

The window 100 is disposed above the electric panel 200. The window may include a cover window formed of glass, sapphire, and/or plastic.

The electric panel 200 includes a display area 200-DA and a non-display area 200-NDA. The display area 200-DA displays (e.g., is configured to display) the image IM and corresponds to (e.g., is arranged above) the display area 100-DA of the window 100. The non-display area 200-NDA is disposed adjacent to the display area 200-DA and corresponds to the non-display area 100-NDA of the window 100.

The electric panel 200 is disposed under the window 100 and provides the image to the window 100. In some embodiments, the electric panel 200 may include a display panel for displaying an image and a touch panel for sensing a touch input. The display panel may be disposed under the touch panel. According to the present exemplary embodiment, the display panel included in the electric panel 200 may be an organic light emitting display panel, but the present invention is not limited thereto. The touch panel may be disposed between the window 100 and the display panel, but the present invention is not limited thereto or thereby. For example, the touch panel may be disposed inside the display panel according to one or more embodiments. The touch panel may be operated in a resistive film mode, an electrostatic capacitive mode and/or an electromagnetic induction mode and obtains coordinate information about a position at which a touch event occurs.

Hereinafter, for convenience of description, an embodiment including the organic light emitting display panel but omitting the touch panel is described.

The electric panel 200 includes a substrate 210, an organic light emitting element, and a sealing layer 220. The organic light emitting element is disposed on the substrate 210. The sealing layer 220 is disposed on the substrate 210 and seals the organic light emitting element from the outside.

The organic light emitting element includes a first electrode, an organic light emitting layer, and a second electrode. The first electrode may be an anode electrode or a positive electrode. The second electrode may be a cathode electrode or a negative electrode. The first electrode generates holes and the second electrode generates electrons. The holes and the electrons are injected into the organic light emitting layer from the first and second electrodes, respectively. The holes and electrons injected into the organic light emitting layer are recombined in the organic light emitting layer to generate excitons, and the organic light emitting element emits light as the excitons return to a ground state from an excited state.

The electric panel 200 includes a display surface on which the image IM may be displayed and a rear surface facing the display surface. In FIG. 2, the display surface corresponds to an upper surface of the sealing layer 220 and the rear surface corresponds to a lower surface of the substrate 210.

The display device DD may further include a flexible printed circuit board FPCB and a printed circuit board PCB.

The flexible printed circuit board FPCB electrically connects the electric panel 200 and the printed circuit board PCB to each other. One end of the flexible printed circuit board FPCB is connected to one surface of the substrate 210 that is exposed through the sealing layer 220, and the other end of the flexible printed circuit board FPCB is connected to the printed circuit board PCB. The flexible printed circuit board FPCB is flexible.

The printed circuit board PCB applies signals to the electric panel 200 through the flexible printed circuit board FPCB or receives signals from the electric panel 200 through the flexible printed circuit board FPCB. In addition, the printed circuit board PCB is connected to a connector CB to receive signals from the outside.

Figure 3:
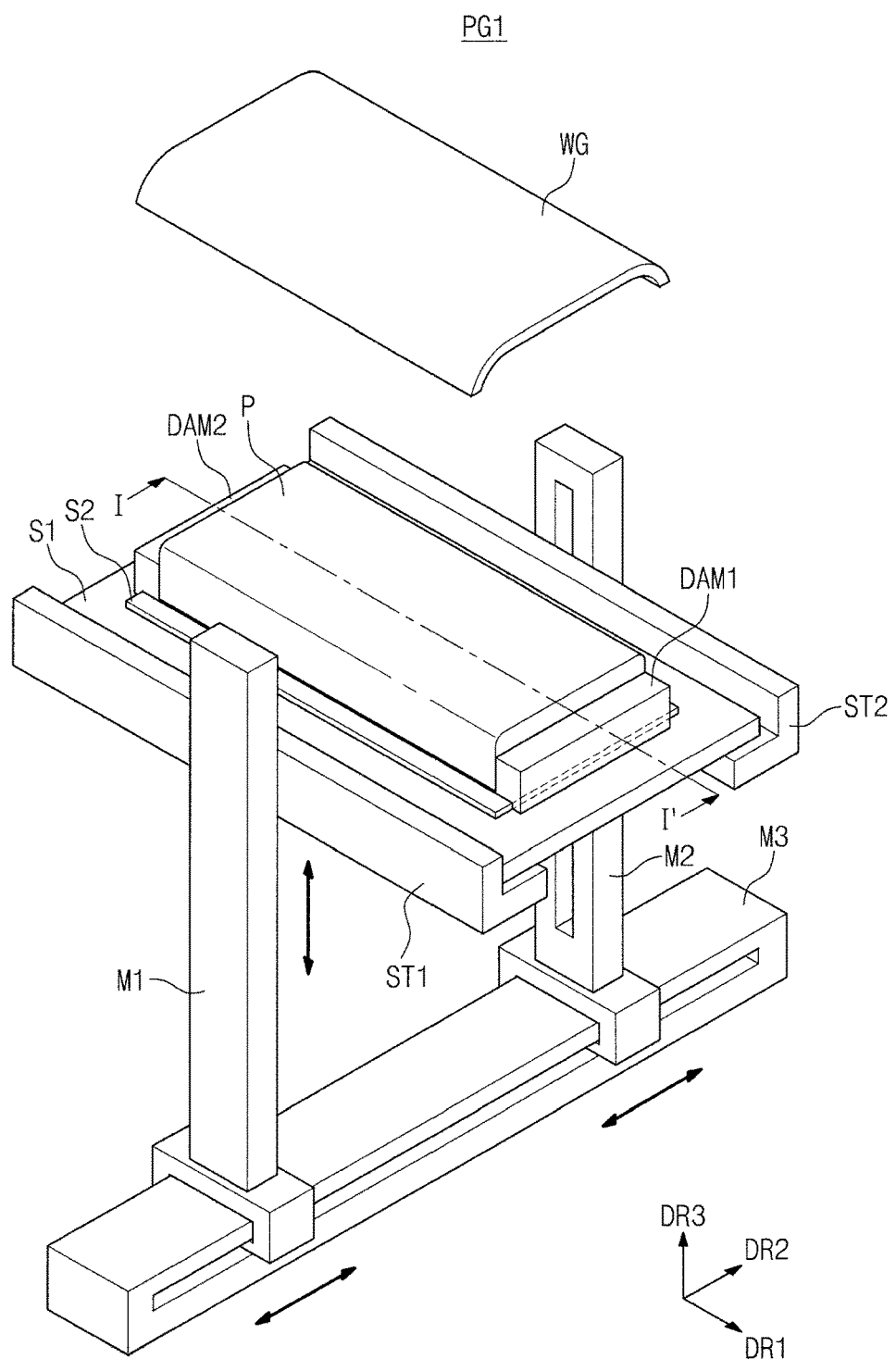
FIG. 3 is a perspective view of a lamination device that attaches an electric panel to a window of the display device of FIG. 2.
Figure 4:
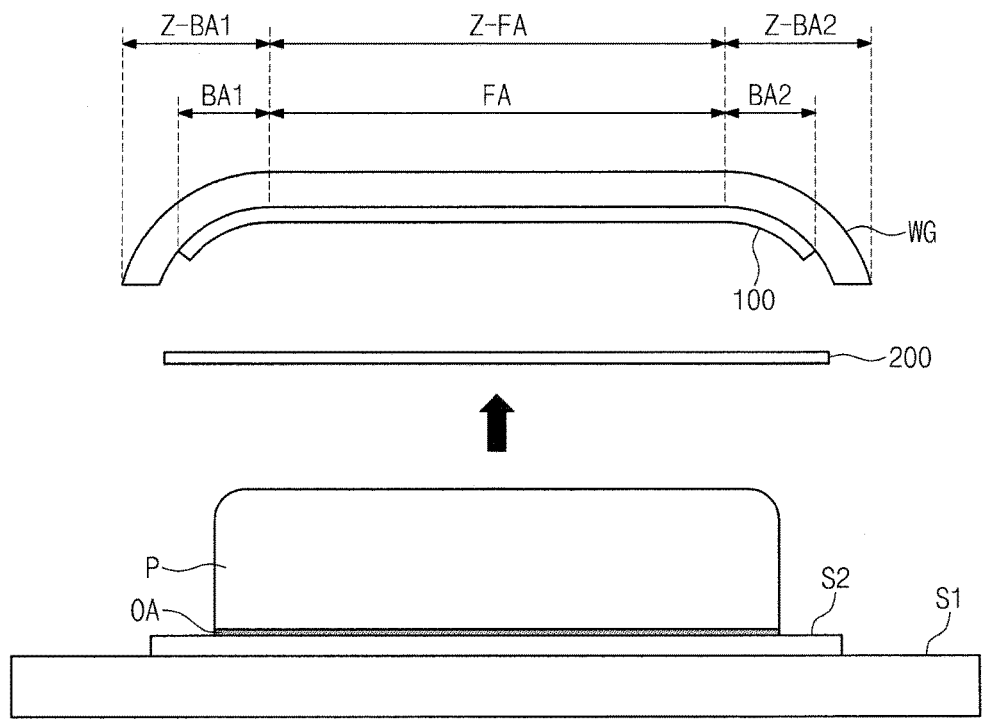
FIGS. 4-5 are side views illustrating the attachment between the electric panel and the window using a pad.
Figure 5:
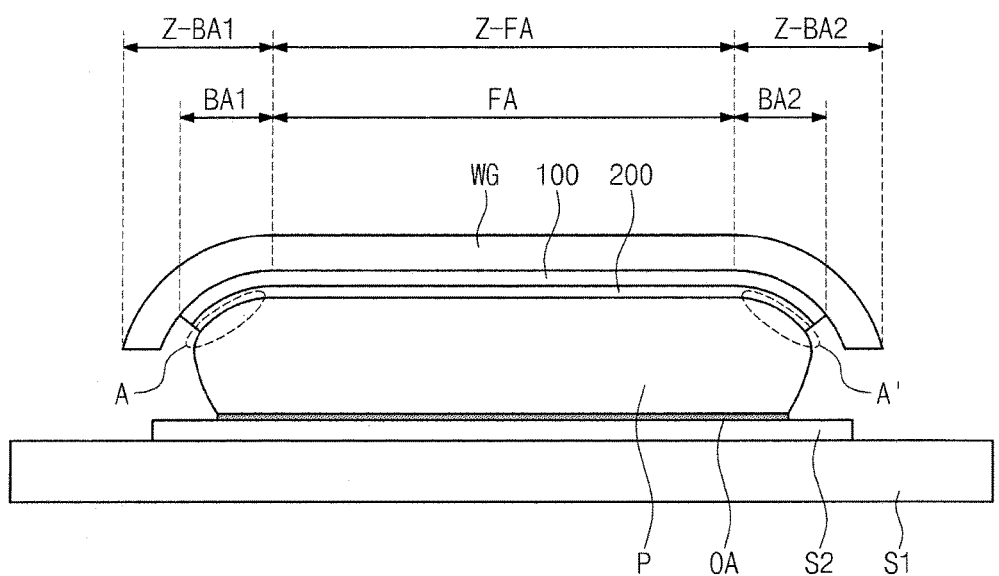

FIG. 3 is a perspective view of a lamination device PG1 that attaches the electric panel 200 to the window 100 of the display device DD of FIG. 2, and FIGS. 4 and 5 are side views illustrating the attachment between the electric panel 200 and the window 100 using a pad P.

Referring to FIG. 3, the lamination device PG1 includes a support member, a first plate S1, a second plate S2, a jig WG, a first dam DAM1, a second dam DAM2, and a pad P.

The support member includes a first support M1, a second support M2, a third support M3, a first support table ST1, and a second support table ST2.

Each of the first and second supports M1 and M2 extends along (e.g., has a shape primarily extending along) the third direction DR3 and the first and second supports M1 and M2 are spaced from (e.g., spaced apart from) each other such that the first and second support tables ST1 and ST2 are disposed between the first and second supports M1 and M2. The third support M3 extends along (e.g., has a shape primarily extending along) the second direction DR2 and is coupled to the first and second supports M1 and M2. The third support M3 is shaped such that the first and second supports M1 and M2 may move along the third support M3 along the second direction DR2.

In more detail, one end (e.g., a first end) of the first support M1 is coupled to the third support M3. The first support M1 moves along the second direction DR2 while being coupled to the third support M3. One end (e.g., a first end) of the second support M2 is spaced from the first support M1 and is coupled to the third support M3. The second support M2 moves along the second direction DR2 while being coupled to the third support M3.

The third support M3 may include a moving rail to allow (or facilitate) movement of the first and second supports M1 and M2 along the second direction DR2. The third support M3 may have or define a groove at which the first and second supports M1 and M2 may be coupled to the third support M3, and the moving rail, which extends along the second direction DR2, may be disposed (or accommodated) in the groove. As such, the first and second supports M1 and M2 may move along the moving rail along the second direction DR2 included in the third support M3.

However, the coupling structure between the first and second supports M1 and M2 and the third support M3 is not limited thereto or thereby. For example, the third support M3 may further include a moving rail to allow the first and second supports M1 and M2 to move along the first direction DR1. As such, the third support M3 may extend along the first and second directions DR1 and DR2.

The first support table ST1 has a step difference shape and extends along the first direction DR1. The first support table ST1 is coupled to and fixed at a side surface of the first support M1. The first support table ST1 is fixed to the first support M1 and moves along the third direction DR3. As such, the first support M1 may include a moving rail that facilitates movement of the first support table ST1 along the third direction DR3. For example, the first support M1 may have or define a groove for coupling the first support M1 to the first support table ST1, and the moving rail, which extends in the third direction DR3, may be disposed (or accommodated) in the groove. As a result, the first support table ST1 may move along the third direction DR3 along the moving rail included in the first support M1.

The second support table ST2 has a step difference shape and extends along the first direction DR1. The second support table ST2 is coupled to a side surface of the second support M2. The second support table ST2 is disposed above the third support M3 and is fixed to the second support M2 to be located at the same height as the first support table ST1. In addition, the first and second support tables ST1 and ST2 are disposed such that the stepped portion of the first support table ST1 faces the stepped portion of the second support table ST2.

The second support table ST2 is coupled to the second support M2 and moves along the third direction DR3. As such, the second support M2 includes a moving rail that facilitates movement of the second support table ST2 along the third direction DR3. As an example, the second support M2 may have or define a groove for coupling the second support M2 to the second support table ST2, and the moving rail, which extends along the third direction DR3, may be disposed (or accommodated) in the groove. As such, the second support table ST2 may move along the third direction DR3 along the moving rail included in the second support M2.

As described above, the first and second support tables ST1 and ST2 may be respectively coupled to the first and second supports M1 and M2, but the present invention is not limited thereto or thereby.

The first plate S1 has a substantially quadrangular shape and is disposed on the stepped portions of the first and second support tables ST1 and ST2. The first plate S1 may be moved along the second and third directions DR2 and DR3 during the lamination process.

As an example, the first plate S1 may move along the second and third directions DR2 and DR3 while being fixed to the first and second tables ST1 and ST2. In some embodiments, the lamination device PG1 may further include a control unit that controls the first, second and third supports M1, M2 and M3 to allow the first plate S1 to move along the second and third directions DR2 and DR3.

The second plate S2 has a substantially quadrangular shape and is disposed on the first plate S1. The second plate S2 has a smaller size than that of the first plate S1 in the first and second directions DR1 and DR2.

In some exemplary embodiments, the second plate S2 also has a thickness that is less than that of the first plate S1. The second plate S2 has sufficient strength to support a weight of the pad P. The first plate S1 is fixed to the first and second support tables ST1 and ST2 and has a strength that is greater than the strength of the second plate S2 to support the second plate S2 and the pad P. Accordingly, the first plate S1 has a thickness that is greater than the thickness of the second plate S2, and thus, the first plate S1 may support the second plate S2 and the pad P.

The pad P is disposed on the second plate S2 to face the jig WG in the third direction DR3. The pad P includes an elastic material (e.g., urethane, silicon, rubber, etc.) and is disposed on the second plate S2.

The first dam DAM1 and the second dam DAM2 are disposed on the first and second plates S1 and S2 to face each other in the first direction DR1. In more detail, the first dam DAM1 supports one side surface (e.g., a first side surface) from among two side surfaces facing each other of the pad P, and the second dam DAM2 supports the other side surface (e.g., a second side surface) from among the two side surfaces facing each other of the pad P. For example, the first and second dams DAM1 and DAM2 support opposing (or opposite) side surfaces of the pad P.

The jig WG is disposed above the pad P to face the pad P. In the present exemplary embodiment, the jig WG has a partially curved shape that is curved in the second direction DR2.

As described above, because the display device DD has the curved shape, the lamination device PG1 may attach the electric panel 200 to the window 100 using the pad P.

In more detail, referring to FIGS. 4 and 5, the jig WG includes a jig flat portion Z-FA, a first jig curved portion Z-BA1 connected to (e.g., extending from) the jig flat portion Z-FA and curved, and a second jig curved portion Z-BA2 connected to (e.g. extending from) the jig flat portion Z-FA and curved. The first and second jig curved portions Z-BA1 and Z-BA2 are spaced from (e.g., spaced apart from) each other with the jig flat portion Z-FA disposed between the first and second jig curved portions Z-BA1 and Z-BA2.

The window 100 is held to (e.g., adhered to) a lower surface of the jig WG. The flat portion FA of the window 100 is held by the jig flat portion Z-FA of the jig WG. The first curved portion BA1 of the window 100 is held by the first jig curved portion Z-BA1 of the jig WG, and the second curved portion BA2 of the window 100 is held by the second jig curved portion Z-BA2 of the jig WG.

The pad P is attached to the second plate S2 by an adhesive layer OA. The pad P pressurizes the electric panel 200 in an upward direction (e.g., in a direction toward the jig WG) and, thus, the electric panel 200 is attached to the window 100.

The position of the pad P may be controlled by the support member (see FIG. 3). For example, because the support member moves the first plate S1, the positions of the second plate S2 and the pad P, which are fixed to the first plate S1, may also be controlled. For example, the first support table ST1 connected to the first support M1 and the second support table ST2 connected to the second support M2 move along the third direction DR3, and, thus, the pad P moves along the third direction DR3. As a result, the pad P rises to the jig WG, and, thus, the electric panel 200 is pressurized to the window 100.

In some embodiments, the electric panel 200 may be fixed by a clamp. The electric panel 200 fixed to the clamp is attached to the lower surface of the window 100. However, because the electric panel 200 having the flat shape is attached to the lower surface of the window 100 having the curved shape, the electric panel 200 may not be completely attached to the window 100 at the first and second curved portions BA1 and BA2. For example, the electric panel 200 may be separated from (or may separate from) the window 100 at the first and second curved portions BA1 and BA2.

According to the present exemplary embodiment, the pad P pressurizes the electric panel 200, and as a result, the electric panel 200 may be prevented from being separated from the window 100 at the first and second curved portions BA1 and BA2.

As shown in FIG. 5, when the pad P rises to the window 100, the electric panel 200 may be more securely attached to the window 100. As a result, the electric panel 200 and the window 100 may be more securely attached to each other. Accordingly, the electric panel 200 and the window 100 may be prevented from becoming separated from each other at the first and second curved portions BA1 and BA2.

Meanwhile, the pad P and the electric panel 200 may rub (e.g., rub abrasively or chafe) against each other when the pad P pressurizes the electric panel 200 to the window 100. For example, a rubbing or abrading phenomenon between the pad P and the electric panel 200 may be intensified at an area A corresponding to the first curved portion BA1 and at an area A' corresponding to the second curved portion BA2 compared to at the flat portion FA. In the present embodiment, the area A corresponds to an area in which the pad P and the window 100 are attached to each other in the first curved portion BA1, and the area A' corresponds to an area in which the pad P and the window 100 are attached to each other in the second curved portion BA2.

In more detail, the pad P disposed between the electric panel 200 and the second plate S2 is attached to the electric panel 200 and the second plate S2 by the control of the support member. Then, the pad P is pressurized to the jig WG to prevent the electric panel 200 from being separated from the window 100. As such, the pad P may be deformed due to elasticity thereof, and portions of the pad P may be abrasively rubbed against both ends of the electric panel 200 in the areas A and A' due to the deformation of the pad P. As a result, the pad P may be abraded.

In general, when the wearing of the pad P reaches a certain level, the pad P may need to be replaced with another pad. In a conventional lamination device, however, the first and second plates S1 and S2 are integrally formed with each other and the pad P is attached to the second plate S2. Therefore, the first and second plates S1 and S2 must also be replaced when the pad P is replaced with a new pad. As a result, a manufacturing cost of the display device increases.

According to one or more exemplary embodiments of the present invention, the second plate S2 is attachable to and detachable from (e.g., is removably coupled to) the first plate S1, and thus, only the second plate S2 must be replaced when the pad P is replaced with another pad. In other words, only the second plate S2 is replaced when the pad P is replaced.

Figure 6:
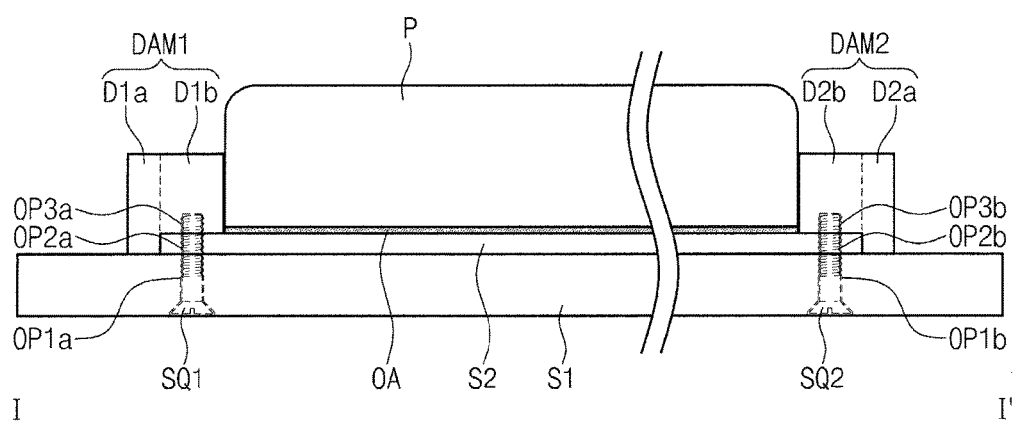
FIG. 6 is a cross-sectional view taken along the line I-I' of FIG. 3.
Figure 7:
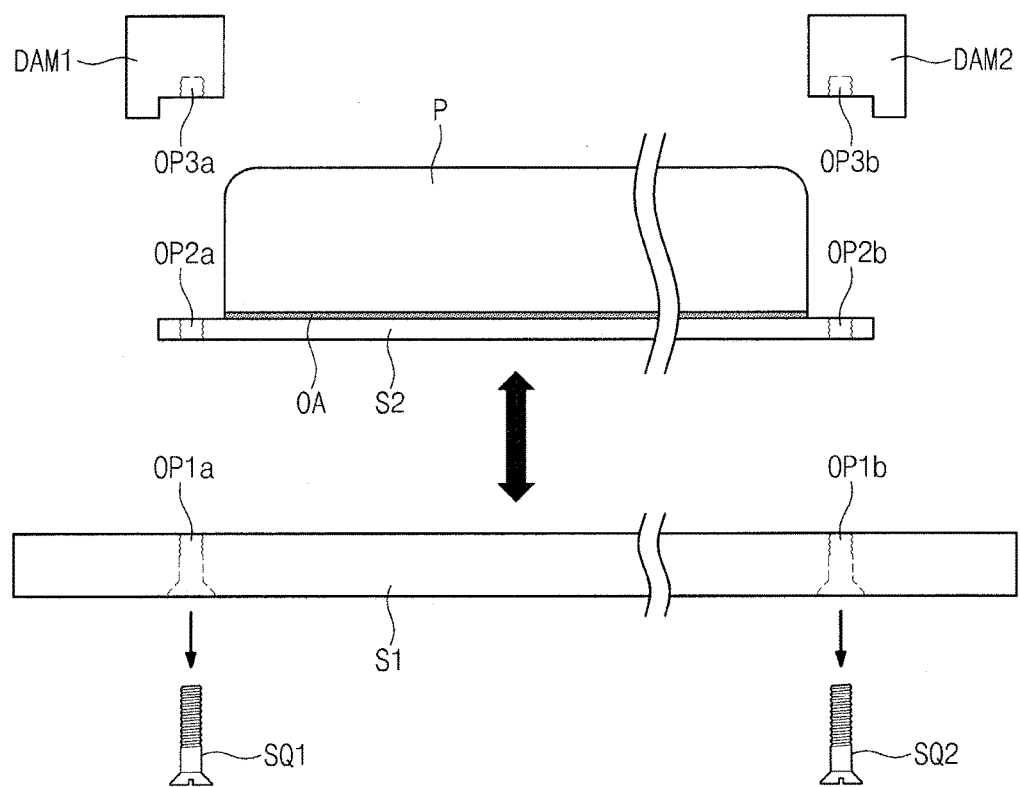
FIG. 7 is an exploded side view of the lamination device shown in FIG. 6.

FIG. 6 is a cross-sectional view taken along the line I-I' of FIG. 3, and FIG. 7 is an exploded view of the lamination device of FIG. 6.

Referring to FIGS. 6 and 7, the second plate S2 is disposed on the first plate S1, and the pad P is attached to the second plate S2 by the adhesive layer OA. In addition, the first dam DAM1 and the second dam DAM2 are disposed above the first and second plates S1 and S2 to overlap with the first and second plates S1 and S2 such that the pad P is disposed between the first and second dams DAM1 and DAM2. In the present exemplary embodiment, the second plate S2 has an area that is smaller than that of the first plate S1 and is greater than that of the pad P. In FIG. 6, the support member shown in FIG. 3 is omitted to enhance clarity.

The first and second plates S1 and S2 are coupled to each other by a first coupling member SQ1 and a second coupling member SQ2. According to the present exemplary embodiment, the first and second coupling members SQ1 and SQ2 do not overlap with the pad P in the third direction DR3 while being coupled to the first and second plates S1 and S2. As an example, each of the first and second coupling members SQ1 and SQ2 may include a screw that couples the first and second plates S1 and S2 to each other. The first plate S1 defines a first coupling opening (e.g., a first coupling hole) OP1*a* formed therethrough, through which the first coupling member SQ1 is inserted. The second plate S2 defines a second coupling opening (e.g., a second coupling hole) OP2*a* formed therethrough that overlaps with the first coupling hole OP1*a*, through which the first coupling member SQ1 is inserted.

The lamination device according to one or more embodiments of the present disclosure is not limited to the above-mentioned structure. For example, the first and second coupling members SQ1 and SQ2 may be replaced with other suitable coupling members. In addition, the first and second coupling members SQ1 and SQ2 may couple the first and second plates S1 and S2 to each other, but the present invention is not limited thereto or thereby. For example, a plurality of coupling members may be used to couple the first and second plates S1 and S2 to each other. As such, the first and second plates S1 and S2 include a plurality of coupling openings and a plurality of coupling recesses, which are engaged with the coupling members.

The first dam DAM1 has an integrally formed step difference shape and is disposed on or above the first and second plates S1 and S2 to overlap with the first and second plates S1 and S2. The first dam DAM1 includes a first fixing dam portion D1$a$ disposed on the first plate S1. In addition, the first dam DAM1 includes a first pad contact dam portion D1$b$ that extends from the first fixing dam portion D1$a$ to support one side surface (e.g., a first side surface) of the pad P. The first pad contact dam portion D1$b$ is disposed on the second plate S2.

The first pad contact dam portion D1$b$ defines or has a first coupling recess OP3$a$ aligned with the first and second coupling openings OP1$a$ and OP2$a$. As such, the first coupling member SQ1 engages the first pad contact dam portion D1$b$ at the first coupling recess OP3$a$ after passing through the first and second coupling openings OP1$a$ and OP2$a$.

In addition, the first plate S1 defines or has a third coupling opening (e.g., a third coupling hole) OP1$b$ formed therethrough, through which the second coupling member SQ2 is inserted. The second plate S2 defines or has a fourth coupling opening (e.g., a fourth coupling hole) OP2$b$ formed therethrough and aligned with the third coupling opening OP1$b$, through which the second coupling member SQ2 is inserted.

The second dam DAM2 has an integrally formed step difference shape and is disposed on or above the first and second plates S1 and S2 to overlap with the first and second plates S1 and S2. The second dam DAM2 includes a second fixing dam portion D2$b$ disposed on the first plate S1. In addition, the second dam DAM2 includes a second pad contact dam portion D2$b$ that extends from the second fixing dam portion D2$a$ to support the other side surface (e.g., a second side surface) of the pad P, which faces the first side surface of the pad P. The second pad contact dam portion D2$b$ is disposed on the second plate S2.

The second pad contact dam portion D2$b$ defines or has a second coupling recess OP3$b$ that aligns with the third and fourth coupling openings OP1$b$ and OP2$b$. As such, the second coupling member SQ2 engages the second contact dam portion D2$b$ at the second coupling recess OP3$b$ after passing through the third and fourth coupling openings OP1$b$ and OP2$b$.

As described above, the first plate S1, the second plate S2, and the first dam DAM1 are fixed to each other by the first coupling member SQ1, and the first plate S1, the second plate S2, and the second dam DAM2 are fixed to each other by the second coupling member SQ2. In addition, the pad P is fixed to the second plate S2 by the adhesive layer OA.

As shown in FIG. 7, the first coupling member SQ1 is separated from (e.g., is removed from) the first plate S1, the second plate S2, and the first dam DAM1 when the pad P is replaced. The second coupling member SQ2 is separated from (e.g., is removed from) the first plate S1, the second plate S2, and the second dam DAM2 when the pad P is replaced. As such, when the pad P is replaced, only the second plate S2, to which the pad P is attached, is replaced with a new second plate and the first plate S1 may be reused. Therefore, a manufacturing cost of the lamination process may be reduced.

Figure 8:
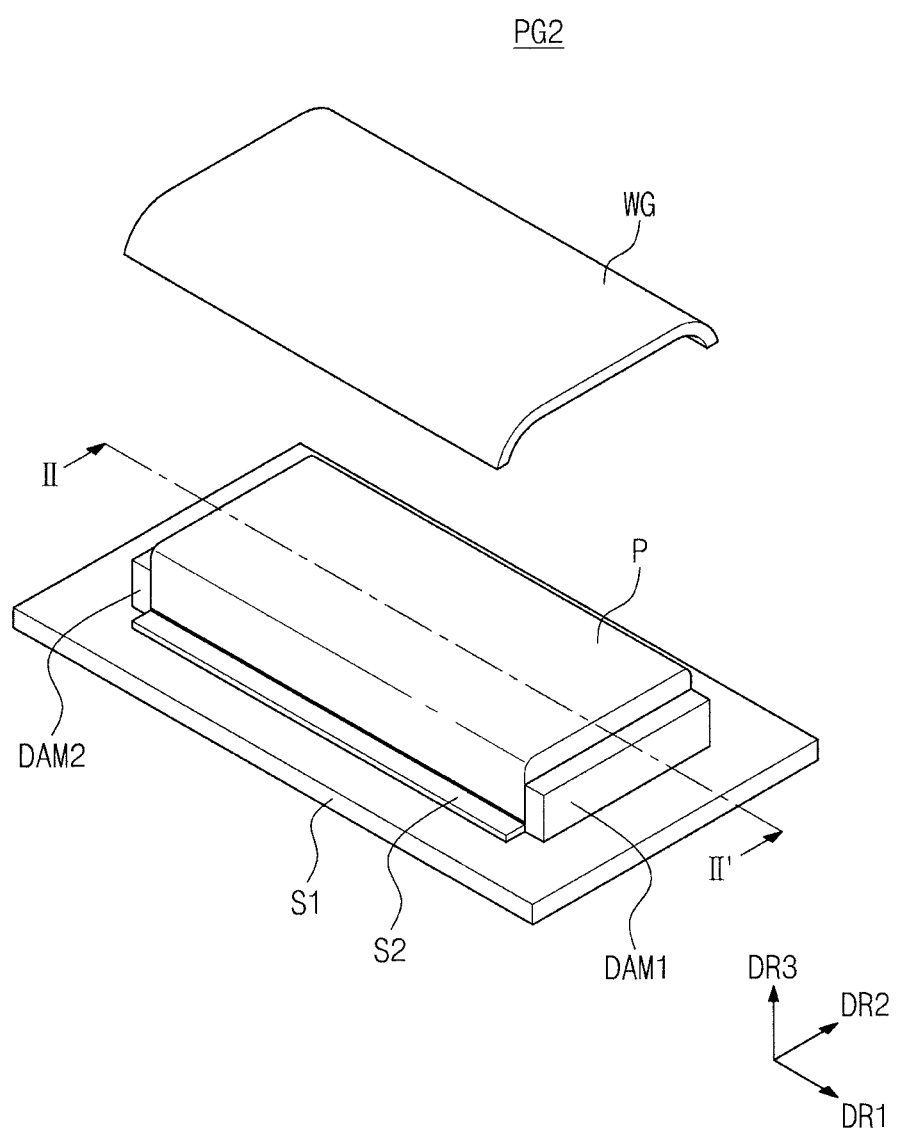
FIG. 8 is a perspective view of a lamination device according to one or more exemplary embodiments of the present disclosure.
Figure 9:
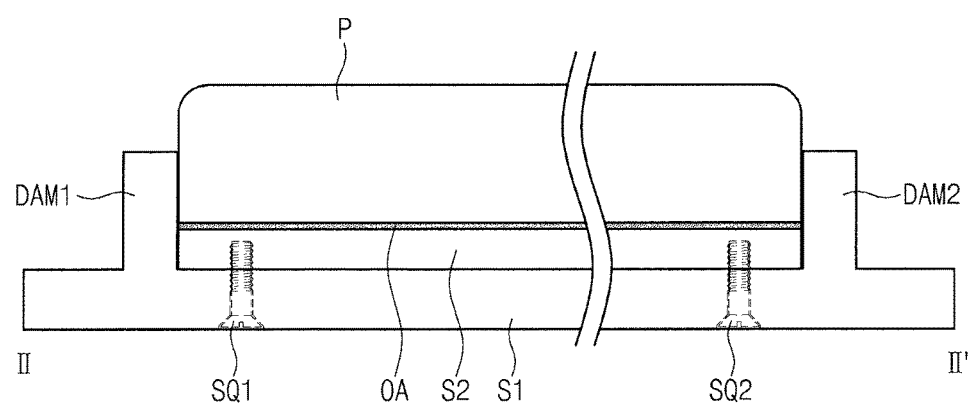
FIG. 9 is a cross-sectional view taken along the line II-II' of FIG. 8.
Figure 10:
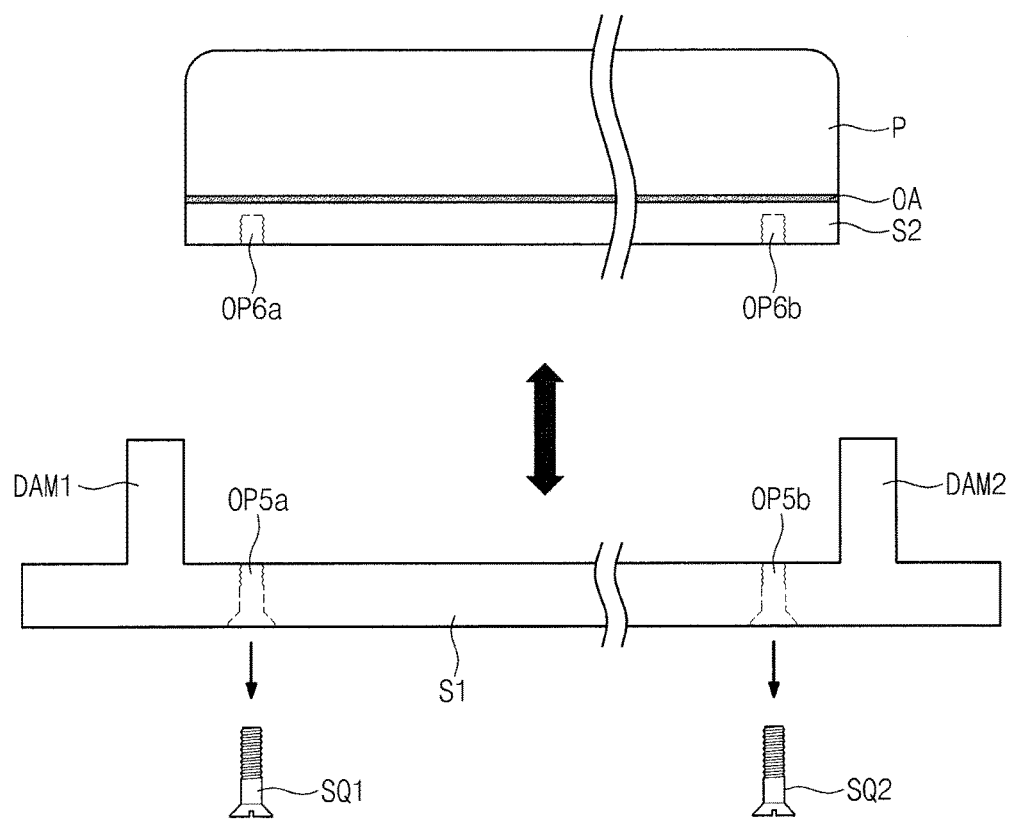
FIG. 10 is an exploded side view of the lamination device shown in FIG. 9.

FIG. 8 is a perspective view of a lamination device PG2 according to one or more exemplary embodiments of the present disclosure, FIG. 9 is a cross-sectional view taken along the line II-II' of FIG. 8 and FIG. 10 is an exploded view of the lamination device PG2 of FIG. 9.

The lamination device PG2 shown in FIG. 8 has the same or substantially the same structure and function as the lamination device PG1 of FIG. 3 except for the second plate S2, the first dam DAM1 and the second dam DAM2. Accordingly, additional descriptions of the first, second and third supports M1, M2 and M3, the first and second support tables ST1 and ST2, and the jig WG may be omitted.

Unlike the lamination device PG1 shown in FIG. 3, in which the first plate S1, the second plate S2, and the first and second dams DAM1 and DAM2 are coupled to each other by the coupling member. The lamination device PG2 illustrated in FIG. 8 includes a first plate S1 and a second plate S2 that are coupled to each other by a coupling member.

Referring to FIGS. 8-10, the second plate S2 may be disposed on the first plate S1, and a pad P may be attached onto the second plate S2 by an adhesive layer OA. In addition, the first and second dams DAM1 and DAM2 may be disposed on and overlapped with the first plate S1 such that the pad P is disposed between the first and second dams DAM1 and DAM2. In the present embodiment, the second plate S2 has an area (e.g., an area defined by the first and second directions DR1 and DR2) that is smaller than that of the first plate S1. In addition, the second plate S2 has a length that is less than that of the pad P in the first direction DR1 and that is greater than that of the pad P in the second direction DR2.

The first and second plates S1 and S2 are coupled to each other by a first coupling member SQ1 and a second coupling member SQ2. According to the present exemplary embodiment, the first and second coupling members SQ1 and SQ2 are coupled to the first and second plates S1 and S2 to overlap with the pad P.

In more detail, the first plate S1 may define a first coupling opening (e.g., a first coupling hole) OP5$a$ through which the first coupling member SQ1 is inserted and a second coupling opening (e.g., a second coupling hole) OP5$b$. In addition, the second plate S2 may define a first coupling recess OP6$a$ aligned with the first coupling hole OP5$a$ and a second coupling recess OP6$b$ into which the second coupling member SQ2 is inserted. The first coupling member SQ1 engages with the first coupling recess OP6$a$ after passing through the first coupling opening OP5$a$. The second coupling member SQ2 engages with the second coupling recess OP6$b$ after passing through the second coupling opening OP5$b$.

The first and second dams DAM1 and DAM2 protrude from the first plate S1 to the third direction DR3 such that the pad P is disposed between the first and second dams DAM1 and DAM2. For example, the first and second dams DAM1 and DAM2 support opposing side surfaces of the pad P and are integrally formed with the first plate S1.

As described above, the first and second plates S1 and S2 are fixed to each other by the first and second coupling members SQ1 and SQ2.

As shown in FIG. 10, when the pad P is replaced, the first and second coupling members SQ1 and SQ2 may be separated from the first and second plates S1 and S2. Therefore, when the pad P needs to be replaced, only the second plate S2, to which the pad P is attached, may be replaced with another second plate S2, and the first plate S1 may be reused with a new pad P.

Figure 11:
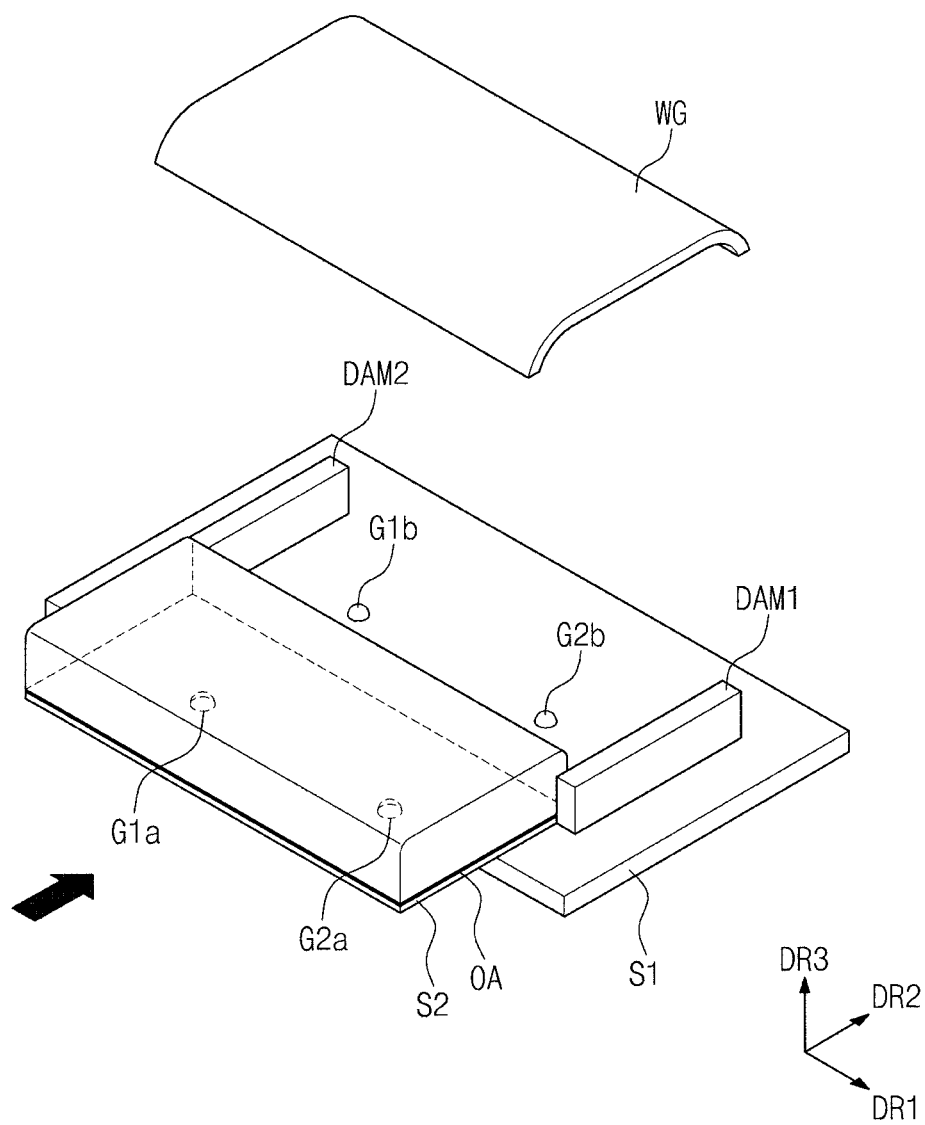
FIG. 11 is a perspective view of a lamination device according to one or more exemplary embodiments of the present disclosure.
Figure 12:
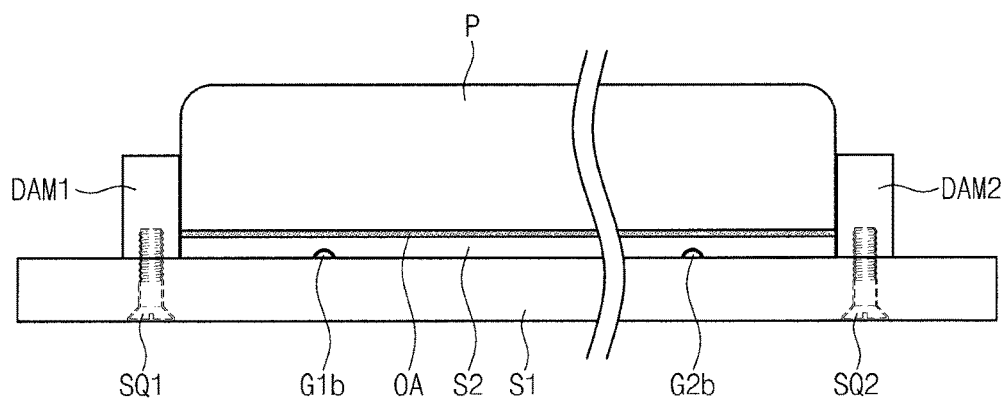
FIG. 12 is a cross-sectional view of the lamination device shown in FIG. 11.

FIG. 11 is a perspective view of a lamination device PG3 according to one or more exemplary embodiments of the present disclosure, and FIG. 12 is a cross-sectional view of the lamination device PG3 of FIG. 11.

The lamination device PG3 shown in FIG. 11 has the same or substantially the same structure and function as the lamination device PG1 of FIG. 3, except for the first plate S1, the second plate S2, the first dam DAM1, and the second dam DAM2. Thus, additional descriptions of the first, second and third supports M1, M2 and M3, the first and second support tables ST1 and ST2, and the jig WG may be omitted.

Unlike the lamination devices PG1 and PG2 shown in FIGS. 3 and 8, in which the first plate S1 and the second plate S2 are coupled to each other by the coupling member, the lamination device PG3 illustrated in FIG. 11 may include a first plate S1 and a second plate S2 that are coupled to each other by a sliding method.

In more detail, the first plate S1 may include a first coupling protrusion G1b and a second coupling protrusion G2b, which couple the first plate S1 to the second plate S2. The first and second coupling protrusions G1b and G2b are disposed between the first and second dams DAM1 and DAM2 disposed on the first plate S1.

According to the present exemplary embodiment, the first and second coupling protrusions G1b and G2b protrude in the third direction DR3 from portions of the first plate S1. In addition, the first and second coupling protrusions G1b and G2b may move along the third direction DR3 when an external force is applied (e.g., an external pressurization force). For example, the first and second coupling protrusions G1b and G2b may move in a downward direction of the first plate S1 when the first and second coupling protrusions G1b and G2b are pressurized by portions of the second plate S2. In the present embodiment, the downward direction of the first plate S1 corresponds to the third direction DR3, along which the jig WG moves toward the first plate S1.

The second plate S2 defines a first coupling recess G1a aligned with the first coupling protrusion G1b and a second coupling recess G2a aligned with the second coupling protrusion G2b.

According to the present exemplary embodiment, when the second plate S2 is coupled to the first plate S1, the second plate S2 is inserted between the first and second dams DAM1 and DAM2 along the second direction DR2. As such, because the second plate S2 is inserted between the first and second dams DAM1 and DAM2, the first coupling protrusion G1b is coupled to the first coupling recess G1a and the second coupling protrusion G2b is coupled to the second coupling recess G2a. Thus, the first coupling protrusion G1b is aligned with the first coupling recess G1a and the second coupling protrusion G2b is aligned with the second coupling recess G2a.

The first and second dams DAM1 and DAM2 have a shape that protrudes from the first plate S1 in the third direction DR3 such that the pad P is disposed between the first and second dams DAM1 and DAM2. For example, the first and second dams DAM1 and DAM2 respectively support opposing side surfaces of the pad P and are coupled to the first plate S1. For example, the first dam DAM1 is coupled to the first plate S1 by the first coupling member SQ1, and the second dam DAM2 is coupled to the first plate S1 by the second coupling member SQ2.

As shown in FIG. 12, the first and second dams DAM1 and DAM2 may be coupled to the first plate S1 by the first and second coupling members SQ1 and SQ2, but the present invention is not limited thereto or thereby. For example, the first and second dams DAM1 and DAM2 may protrude from the first plate S1 along the third direction DR3. For example, the first and second dams DAM1 and DAM2 may be integrally formed with the first plate S1.

When the pad P is replaced, the second plate S2 may be separated from the first plate S1 along the second direction DR2. Accordingly, when the pad P is replaced, the second plate S2, to which the pad P is attached, may be replaced with another second plate S2, and the first plate S1 may be reused with a new pad P.

Although the exemplary embodiments of the present invention have been described, it is understood that the present invention should not be limited to these exemplary embodiments, but various changes and modifications can be made by those of ordinary skill in the art without departing from the spirit and scope of the present invention as defined by the following claims and their equivalents.

What is claimed is:

1. A lamination device comprising:
   a support table;
   a first plate coupled to the support table;
   a second plate coupled to the first plate and configured to be attachable to and detachable from the first plate;
   a jig spaced from the second plate and configured to hold a window, the jig comprising:
   a flat surface portion; and
   side surface portions extending from opposite sides of the flat surface portion; and
   a pad on the second plate and configured to pressurize an electric panel on the window.

2. The lamination device of claim 1, further comprising dams respectively supporting opposing side surfaces of the pad.

3. The lamination device of claim 2, wherein each of the dams comprises:
   a pad contact dam portion on the second plate; and
   a fixing dam portion on the first plate and extending from the pad contact dam portion.

4. The lamination device of claim 3, wherein the second plate comprises:
   a pad portion to which the pad is attached; and
   coupling portions adjacent to the pad portion, respective ones of the coupling portions corresponding to respective ones of the pad contact dam portions.

5. The lamination device of claim 3, further comprising a coupling member,
   wherein the first plate defines first coupling openings,
   wherein the second plate defines second coupling openings aligned with the first coupling openings,
   wherein each of the pad contact dam portions define coupling recesses aligned with the second coupling openings, and
   wherein the coupling member is coupled to the first plate at the first coupling openings, the second plate at the second coupling openings, and the pad contact dam portions at the respective coupling recesses.

6. The lamination device of claim 2, wherein the first plate comprises a flat surface portion supporting the second plate,
   wherein the dams protrude from the flat surface portion of the first plate to respectively support the opposing side surfaces of the pad, and
   wherein the dams are integrally formed with the flat surface portion.

7. The lamination device of claim 6, further comprising a coupling member,
  wherein the first plate defines coupling openings,
  wherein the second plate defines coupling recesses aligned with the coupling openings, and
  wherein the coupling member is coupled to the first plate at the coupling openings and the second plate at the coupling recesses.

8. The lamination device of claim 6, wherein the pad has an area that is equal to an area of the first plate.

9. The lamination device of claim 1, wherein each of the side surface portions of the jig comprises a curved surface portion.

10. The lamination device of claim 1, wherein the pad is elastic.

11. The lamination device of claim 1, wherein the second plate has a thickness that is less than a thickness of the first plate.

12. The lamination device of claim 1, wherein the window comprises:
  a window flat surface portion configured to be attached to the flat surface portion of the jig; and
  window side surface portions bent from the window flat surface portion, and configured to be attached to the side surface portions of the jig.

13. The lamination device of claim 12, wherein the electric panel comprises:
  an electric panel flat surface portion configured to be attached to the window flat surface portion; and
  electric panel curved surface portions bent from opposite sides if the electric panel flat surface portion, and configured to be attached to the window side surface portions.

14. The lamination device of claim 1, further comprising an adhesive layer between the pad and the first plate.

15. A lamination device comprising:
  a support table;
  a first plate comprising a plurality of coupling protrusions, and coupled to the support table;
  a second plate comprising a plurality of coupling recesses configured to be coupled to the coupling protrusions;
  a jig spaced from the second plate and configured to hold a window, the jig comprising:
  a flat surface portion; and
  side surface portions extending from opposite sides of the flat surface portion;
  a pad on the second plate and configured to pressurize an electric panel on the window;
  a first dam supporting a first side surface of the pad; and
  a second dam facing the first dam and supporting a second side surface of the pad,
  wherein the coupling protrusions are coupled to the coupling recesses when the first plate is inserted between the first and second dams.

16. The lamination device of claim 15, wherein the second plate has a thickness that is less than a thickness of the first plate.

17. The lamination device of claim 15, further comprising a first coupling member and a second coupling member,
  wherein the first dam defines a first coupling recess,
  wherein the second dam defines a second coupling recess,
  wherein the first plate defines a first coupling opening aligned with the first coupling recess and a second coupling opening aligned with the second coupling recess,
  wherein the first coupling member is coupled to the first dam at the first coupling recess, and the first plate at the first coupling opening, and
  wherein the second coupling member is coupled to the second dam at the second coupling recess, and the second plate at the second coupling opening.

18. The lamination device of claim 15, wherein the first plate comprises a flat surface portion supporting the second plate,
  wherein the first and second dams protrude from the flat surface portion to respectively support the first side surface and the second side surface of the pad, and
  wherein the first and second dams are integrally formed with the flat surface portion.

19. The lamination device of claim 15, wherein the pad is elastic.

20. The lamination device of claim 15, wherein the pad has an area that is equal to an area of the first plate.

* * * * *